United States Patent [19]
Lembser

[11] Patent Number: 5,913,326
[45] Date of Patent: Jun. 22, 1999

[54] AUTOMATIC CLOSING DEVICE FOR A SHUT-OFF DEVICE

[75] Inventor: Gerhard Lembser, Königswinter, Germany

[73] Assignee: Ruhrgas Aktiengesellschaft, Germany

[21] Appl. No.: 08/591,646

[22] PCT Filed: Jul. 28, 1994

[86] PCT No.: PCT/EP94/02486

§ 371 Date: Feb. 2, 1996

§ 102(e) Date: Feb. 2, 1996

[87] PCT Pub. No.: WO95/04573

PCT Pub. Date: Feb. 16, 1995

[30] Foreign Application Priority Data

Aug. 4, 1993 [DE] Germany .............................. 43 26 072

[51] Int. Cl.⁶ .................................................. F16K 17/38
[52] U.S. Cl. ............................................. 137/79; 137/77
[58] Field of Search ................................. 137/79, 77, 74, 137/75

[56] References Cited

U.S. PATENT DOCUMENTS

| | | | |
|---|---|---|---|
| 1,069,681 | 8/1913 | Dub | 137/77 |
| 1,404,844 | 1/1922 | Fulton | 137/79 |
| 1,502,466 | 7/1924 | Gillen | 137/77 |
| 1,780,387 | 11/1930 | Hart | 137/77 |
| 2,264,677 | 12/1941 | Oxland | 137/79 |
| 2,288,024 | 6/1942 | Persons | 137/79 |
| 2,893,413 | 7/1959 | Nordahl | 137/75 |
| 3,429,321 | 2/1969 | Thrall | 137/77 |
| 4,887,630 | 12/1989 | Hill | 137/79 |

*Primary Examiner*—A. Michael Chambers
*Attorney, Agent, or Firm*—Blakely Sokoloff Taylor & Zafman

[57] ABSTRACT

Typically, for automatically dosing shutoff valves, a valve closing body is held in the open position by fixation with soft solder and can be moved into the closed position by means of a spring action. The disadvantage is that it can only be used on small valves and is restricted to the direct influence of temperature on the shut-off valve itself. Hence, the invention provides improvement using a reaction line and a hollow body to form a closed system. The reaction line which is thermo-sensitive all over its length can be laid at any desired distance from the shut-off device so that a fire occurring at a distance from the shut-off device triggers the closing action. The reaction line can, for example, be arranged in a metering and regulating station so that it stretches over the entire station. The advantage of the design as a reaction line is that the reaction time with regard to fire fighting is reduced to a minimum.

15 Claims, 1 Drawing Sheet

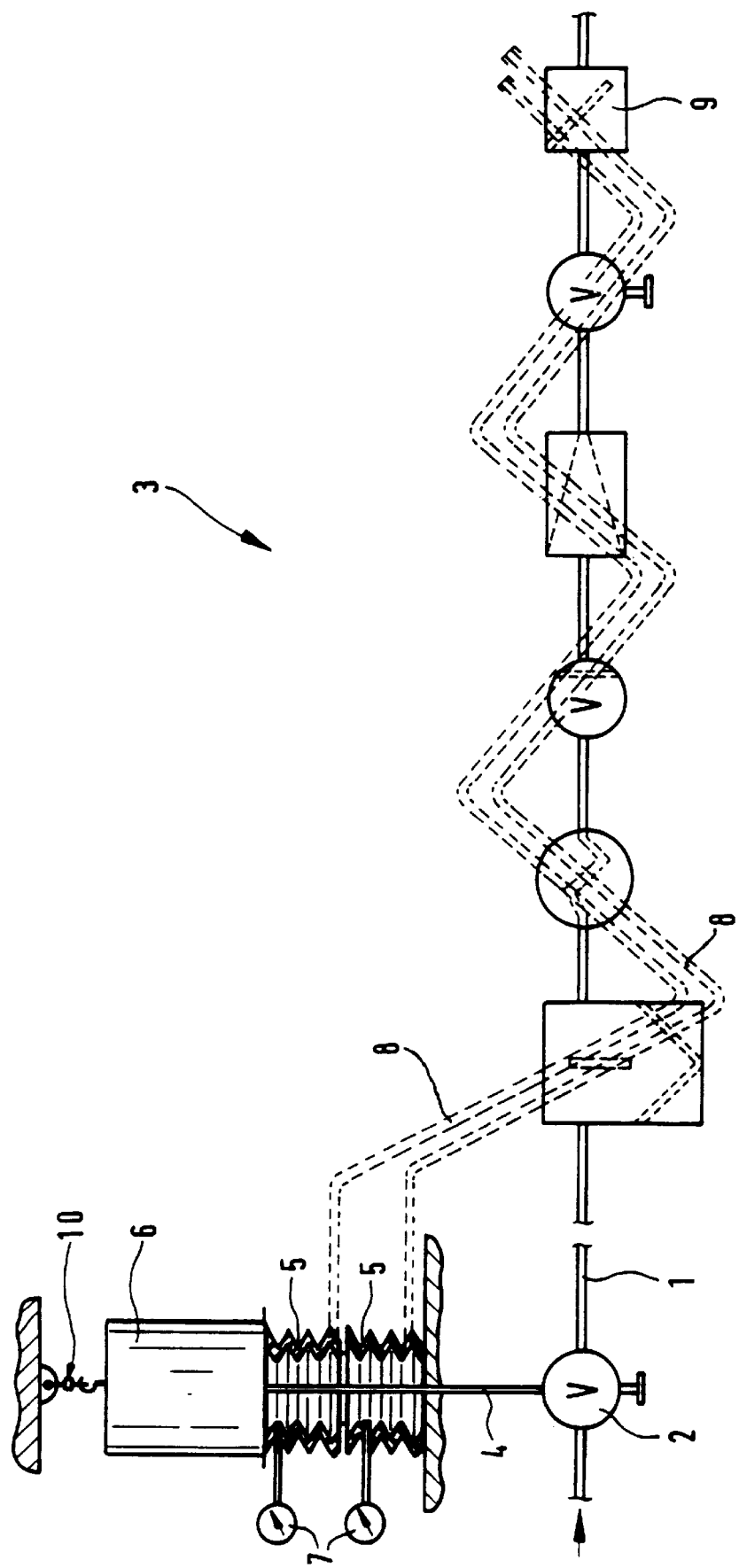

AUTOMATIC CLOSING DEVICE FOR A SHUT-OFF DEVICE

BACKGROUND OF THE INVENTION

1. Field of the Invention

The present invention relates to a shut-off device which closes automatically at a defined threshold temperature, with a shut-off element which is held in the open position by at least one element inhibiting a closing force.

2. Background Art

In order to limit damage in the event of a fire, plant, plant sections and pipeline systems which carry combustible gases or liquids are equipped with reliably isolating shut-off devices. Through the closing of the shut-off device the flow of medium is interrupted and the uncontrolled escape of combustible gases or liquids from a damaged plant section into the downstream system is prevented.

The DE-G 76 27 697 teaches an automatically closing shut-off valve, in particular for gas pipelines. Said shut-off valve exhibits a valve housing, a valve seat between gas inlet and gas outlet and a valve closing body. Said valve closing body is held in the open position by fixation with soft solder and can be moved into the closed position by means of a spring action. In the event of a fire, the soft solder softens and causes the automatic closing of the shut-off valve.

The disadvantage of such a shut-off system is that it can only be used on small valves of one particular kind (globe valves) so that it is limited in its scope of application mainly to the field of residential gas supplies. Furthermore, its function is restricted to the direct influence of temperature on the shut-off valve itself. Plant and plant sections which are operated at high pressure normally have so-called fire-protection valves which are located in a protected position outside the plant building at a sufficient safety distance from said building and can be closed either manually or by a mechanical drive in the event of a fire. It is often not possible to place such valves at a sufficient safety distance from the plant building due to local conditions or, in particular with small plant, the cost of location at a sufficient safety distance is not economically acceptable. Here in the event of fire the actuation of the valves is severely impaired or not possible.

THE INVENTION

Therefore, the object of the present invention was to provide an automatically closing shut-off device of simple design, particularly for the high-pressure range, which closes reliably and automatically if there is an unusual rise in the ambient temperature.

According to the present invention, this task is solved by a shut-off device of the aforementioned type in that the shut-off device has, as an element for inhibiting the closing force, at least one variable-volume hollow body to which pressure is applied and which is designed as a bellows or pressure pad, and has at least one predetermined breaking piece which is made of a material whose melting temperature is set at a defined threshold temperature.

The advantage of such a closing device is that it has a simple and robust design. The shut-off device is kept in the open position by an element inhibiting the closing force. The element can advantageously be formed directly by the variable-volume hollow body to which pressure is applied whilst the closing force is produced, for example by the weight of a body at rest or a spring under tension. When the threshold temperature is reached or exceeded, the closing action is triggered by the material of the breaking piece melting and the pressure falling in the area of the predetermined breaking piece. This releases the force of pressure in the hollow body. The closing force becomes effective and can, depending on the valve design, act directly on the shut-off element or indirectly trigger the closing action via an actuating device so that the flow of combustible fluid is interrupted.

The design of the hollow body as a bellows or an elastic pressure pad has the advantage that, for example, a body acting as an actuating element can be arranged directly on the hollow body. When the pressure falls in the hollow body, said hollow body is pressed together by the weight of the body moving downwards, i.e. the closing force becomes effective. The situation is different with a pretensioned bellows which extends in its length when pressure is applied and contracts again when the pressure falls. In this case, the hollow body is also the actuating element so that an additional element can advantageously be dispensed with.

The arrangement according to the present invention forms an automatic, nearto maintenance-free shut-off system, the shut-off device normally being arranged on the inlet side and, in the event of a fire, cutting off the flow of combustible fluids into the downstream plant sections. If required, the inventive closing device can also be arranged in the outlet area of a plant or a certain plant section. Conventional variable-volume pressure vessels made of various materials are, for example, suitable as hollow bodies. The hollow body is normally arranged outside the housing of the shut-off device but can also be integrated in the housing.

The predetermined breaking piece must be made of a material which can withstand the pressure requirements and exhibits a melting temperature which corresponds to the defined threshold temperature. The threshold temperature must be selected so that it is well below the flame temperature of the fluid present in the pipeline system.

According to the present invention, the predetermined breaking piece is designed as a reaction line so that the hollow body and reaction line form a closed system. The advantage of this design is that the reaction line can be laid at any desired distance from the shut-off device so that a fire occurring at a distance from the shut-off device triggers the closing action. The reaction line can, for example, be arranged in a metering and regulating station so that it stretches over the entire plant system. The advantage of the design as a reaction line is that the reaction time with regard to fire-fighting is reduced to a minimum. The reaction line and hollow body should be as free as possible from detachable connections so that possible sources of leaks are avoided.

To compensate for any leakage losses the hollow-body system can, for example, be connected to a pressure vessel. This can be used as a pressure pad or exhibit a pressure which is higher than that in the hollow-body system. A pressure control valve is then necessary between the pressure vessel and hollow-body system.

Particularly, when the closing device is used in connection with a non-return valve arranged in the outlet area of the plant or another closing device in accordance with the present invention, the plant area affected by the damage can be quickly and reliably cut off from the rest of the system so that the flow of the fluid to the seat of the fire is effectively prevented. Furthermore, the hitherto customary safety distance between the fire valve and plant could also be reduced as a result thereof.

According to another advantageous feature of the present invention the closing force is produced by an actuating element which acts on an actuating device. This means that conventional valves of different designs (butterfly valves, globe valves, gate valves, etc.) can be used as the closing device.

According to another inventive feature, the hollow body also acts on the actuating device or directly on the actuating element so that the shut-off device can also be used as the service valve and therefore the cost of an additional shut-off device can be saved.

In one embodiment of the present invention the hollow body exhibits a monitoring device which permits control of the proper functioning of the shut-off device. A simple form of monitoring is pressure measurement in which the internal pressure in the hollow body is recorded. The measured value can be displayed and/or transmitted to a complex monitoring system so that faults are detected at an early stage and appropriate action can be taken.

Another advantageous embodiment of the present invention is that two or more hollow bodies are arranged downstream of each other and the pertaining reaction lines arranged parallel to each other. The advantage of such an embodiment is that system-inherent accidental triggering of the shut-off device can be more or less precluded. A fault-induced reduction of pressure in one of two or more hollow bodies only leads to the partial closure of the shut-off device and thus at most to a reduction of pressure flow.

If, as is standard engineering practice, it is assumed that simultaneous system-inherent faults on two systems acting independently of each other can be excluded with a high degree of probability, a fault-induced failure of the plant does not need to be considered if the parallel design is used. The triggering of an appropriate alarm signal would therefore be sufficient. The shut-off device will consequently only close completely, in accordance with the designated purpose, when the defined threshold temperature is exceeded as a result of excessive heat propagation (fire) or a wilful act.

In a further embodiment of the present invention the actuating element, the actuating device or the shut-off element can be locked via a locking device which means that the automatic triggering of the device is prevented during maintenance or repair work. The locking of the actuating element also means that the shut-off device can be actuated independently of the automatic closing device.

Combinations of the inventive features which deviate from the combinations discussed hereinabove are deemed to have been disclosed as essential features of the present invention.

The present invention is described in more detail in the following with the aid of a preferred embodiment and an attached drawing.

BRIEF DESCRIPTION OF THE DRAWING

The drawing shows in a single FIGURE the schematic layout of a gas-regulating station with a shut-off device according to the present invention.

DETAILED DESCRIPTION OF THE PRESENT INVENTION

A shut-off valve 2 in the form of a globe valve is arranged in a gas line 1. Said shut-off valve is located in the inlet area of the gas-regulating station, the safety distance between the plant sections 3 belonging to the gas-regulating station and the shut-off valve 2 depends on the prevailing regulations, statutory provisions and/or conditions.

The shut-off element (valve disk) of the shut-off valve 2, which is not illustrated, is firmly connected to an actuating device 4. The shut-off element is kept in the open position by said actuating device 4, two hollow bodies in the form of bellows 5 arranged downstream of each other and to which compressed air is applied counteracting the closing force acting on the actuating device 4. The closing force is produced in this example by the weight of a body at rest 6, other solutions such as, for example, the use of a spring under tension or the use of pretensioned bellows are also conceivable. Each of the bellows 5 exhibits a measuring device 7 measuring the internal pressure.

Furthermore, each bellows 5 exhibits a reaction line 8 designed as a predetermined breaking piece in the form of a small-diameter line, each bellows 5 forming together with the pertaining reaction line 8 a closed system. Conventional aluminium pipes or hoses are, for example, suitable as reaction lines 8. The two reaction lines 8 arranged parallel to each other are arranged in coils above all plant sections 3 of the regulating station to be monitored. In this connection it is not necessary to go into further detail on the depicted plant sections 3, such as filter, preheater, safety shut-off valve, pressure regulator and shut-off valve. A non-return valve 9 is arranged in the outlet of the regulating station.

In the event of damage, e.g. when gas escapes and ignites at one or more points in the regulating station, the threshold or melting temperature of the reaction lines 8 is exceeded in the area of the flames. As, due to their arrangement, the reaction lines 8 stretch over the entire regulating station, it can be presumed that the increase in temperature immediately and directly affects the reaction lines 8 and that they melt at least in the area of the seat of the fire. It can be presumed that already during the melting process the reaction lines 8 will not withstand the internal pressure and burst so that compressed air can escape. Due to the reduction in pressure in the bellows 5, the force acting against the weight of the body 6 reduces and the body 6 leaves its position of rest. The body moves the shut-off element via the actuating device 4, i.e. the valve disk is pressed into the valve seat. This interrupts the flow of gas and ensures that no further gas from the transmission system upstream of the gas-regulating station enters the seat of the fire. Furthermore, the non-return valve 9 is activated so that no fuel can flow back to the seat of the fire from the pipe system downstream of the regulating station. The shut-off valve 2 remains in the closed position until it is manually opened.

The advantage of the parallel arrangement of the reaction lines 8 is that system-inherent accidental triggering of the shut-off device can be avoided. A fault-induced reduction in the pressure in one of the two bellows 5, for example due to a leak, would only lead to a partial closure of the shut-off valve 2. However, this could be detected by an alarm coupled to the internal-pressure-measuring devices 7, so that appropriate action could be taken. The alarm can also be given by a movement detector arranged in or on the shut-off valve 2.

To prevent automatic triggering of the closing device, the body 6 can be locked by means of a locking device 10.

The scope of the present invention also covers modified embodiments. The closing device can be combined without great expense with conventional safety shut-off valves so that the latter are triggered both in the event of too high or too low a pressure in the downstream system and in the event of an excessive increase in temperature. Furthermore, it is not necessary for the hollow body to directly counteract the closing force. It is sufficient if a movement caused by the fall in pressure in the hollow body causes the triggering of the closing force, i.e. the hollow body performs a kind of switch function. Furthermore, several shut-off devices can be combined with closing devices, all closing devices being connected with each other via a common reaction line and several shut-off devices being simultaneously closed in the event of a fire. The hollow-body system need not necessarily be filled with compressed air. For example, inert gases are particularly suitable as the filling medium. The use of combustible gases or liquids is also conceivable.

If the hollow body is designed as a cylinder with a predetermined breaking piece, a piston changes the volume. The piston is, for example, connected via a piston rod to an actuating device on which the closing force also acts. The pneumatic pressure application causes the piston to be pressed into a final position. The enclosed cushion of gas counteracts the closing force and thus keeps the shut-off means in the open position. The melting of the predetermined breaking piece causes a drop in pressure in the cylinder so that the closing force can become effective, the piston leaves its final position and the shut-off means is moved into the closed position via an actuating device.

What I claim is:

1. A shut-off device which closes automatically at a defined threshold temperature, with a shut-off element which is kept in the open position by at least one element inhibiting a closing force comprising:

a shut-off valve including, as the element inhibiting the closing force, at least one variable-volume hollow body to which pressure is applied, said hollow body being a pressure pad, and having a reaction line which is stretchable over a plant system to be protected, said reaction line laid in a manner such that said shut-off device is remote from the fire to be protected from and made of a material whose melting temperature is set at the defined threshold temperature.

2. The shutoff device according to claim 1, wherein the closing force is produced by an actuating element which acts on an actuating device.

3. The shut-off device according to 2, wherein the hollow body acts on the actuating device.

4. The shut-off device according to claim 3, wherein at least one of the actuating element, the actuating device and the shut-off element is lockable by means of a locking device.

5. The shut-off device according to 3 wherein the hollow body acts directly on an actuating element.

6. The shut-off device according to claim 1, wherein the hollow body exhibits a pressure monitoring device.

7. The shut-off device according to claim 1, wherein two hollow bodies are serially connected to each other and corresponding reaction lines are connected in parallel to each other, said corresponding reaction lines combined shuts off said shut-off device when said defined threshold temperature exceeds said melting temperature of said reaction lines, said reaction lines individually partially shuts-off said shut-off device: and an alarm device to trigger an alarm signal in an event of partial shut-off of said shut-off device.

8. The device according to claim 2, wherein two hollow bodies are connected in series to each other and are each connected to one of two reaction lines, the two reaction lines being connected in parallel to each other, said two reaction lines combined shuts-off said shut-off device when said defined threshold temperature exceeds said melting temperature of said reaction lines, said reaction lines individually adapted partially shuts off said shut-off device; and an alarm device to trigger an alarm signal in an event of partial shut-off of said shut-off device.

9. The shut-off device according to claim 1, wherein the hollow body is a bellow.

10. A device for automatically closing a shut-off means at a defined threshold temperature, said device comprising:

a) closing means, which seek to close the shut-off means with a predetermined closing force;

b) a means inhibiting the closing of the shut-off means, said inhibiting means keeping the shut-off means open against said closing force and including:

i) at least one variable-volume hollow body to which pressure is applied; and ii) at least one reaction line which is stretchable over a plant system to be protected, said reaction line laid in a manner such that said shut-off device is remote from the fire to be protected from, said reaction line having a fluid connection with the hollow body and made of a material which has a melting temperature set at said defined threshold temperature, whereby it is possible to reduce the pressure in the hollow body via said reaction line, said inhibiting means being essentially inactive and the shut-off means being closed by the predetermined closing force of the closing means when the defined threshold temperature is exceeded.

11. The device according to claim 8, wherein said hollow body is selected from a group consisting of variable-volume hollow bodies consisting of a bellows and a pressure pad.

12. The device according to claim 8, further containing at least one pressure-monitoring device which is connected to at least one hollow body.

13. The device according to claim 8, wherein the closing means applying the closing force acts on the shut-off means via an actuating means.

14. The device according to claim 13, wherein the variable-volume hollow body acts on the actuating means.

15. The device according to claim 13, further containing a locking device to lock at least one or the shut-off and actuating means.

* * * * *

UNITED STATES PATENT AND TRADEMARK OFFICE
CERTIFICATE OF CORRECTION

PATENT NO. : 5,913,326
DATED : June 22, 1999
INVENTOR(S) : Lembser

It is certified that error appears in the above-identified patent and that said Letters Patent is hereby corrected as shown below:

In [57], line 1, delete "automatically dosing" and insert -- automatically closing --.

In [57], line 1, delete "shutoff valves," and insert -- shut-off valves, --.

In column 5, line 44, delete "according to claim 3," and insert -- according to claim 2, --.

In column 6, line 3, delete "shut-off device:" and insert -- shut-off device; --.

In column 6, line 10, delete "combined shuts-off said" and insert -- combined shuts off said --.

In column 6, line 40, delete "to claim 8" and insert -- to claim 10 --.

In column 6, line 43, delete "to claim 8" and insert -- to claim 10 --.

UNITED STATES PATENT AND TRADEMARK OFFICE
CERTIFICATE OF CORRECTION

PATENT NO. : 5,913,326

DATED : June 22, 1999

INVENTOR(S) : Lembser

It is certified that error appears in the above-identified patent and that said Letters Patent is hereby corrected as shown below:

In column 6, line 46, delete "to claim 8" and insert -- to claim 10 --.

In column 6, line 52, delete "at least one or the" and insert -- at least one of the --.

Signed and Sealed this

Fifteenth Day of May, 2001

NICHOLAS P. GODICI

*Attest:*

*Attesting Officer*     *Acting Director of the United States Patent and Trademark Office*